United States Patent
Sloan et al.

(10) Patent No.: US 6,393,586 B1
(45) Date of Patent: May 21, 2002

(54) METHOD AND APPARATUS FOR DIAGNOSING AND CONVEYING AN IDENTIFICATION CODE IN POST ON A NON-BOOTING PERSONAL COMPUTER

(75) Inventors: Jeff Sloan, Round Rock; Tim Sullivan; David Springer, both of Austin, all of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/245,148

(22) Filed: Feb. 4, 1999

(51) Int. Cl.⁷ .................................................. G06F 11/34
(52) U.S. Cl. .................................. 714/25; 713/2; 713/1
(58) Field of Search ............................. 714/25, 36, 55; 717/124; 713/1, 2; 709/222; 710/10, 104

(56) References Cited

U.S. PATENT DOCUMENTS

| | | |
|---|---|---|
| 5,245,615 A | 9/1993 | Treu |
| 5,379,436 A | 1/1995 | Tanaka |
| 5,491,788 A | 2/1996 | Cepulis et al. |
| 5,528,516 A | 6/1996 | Yemini et al. |
| 5,535,330 A | 7/1996 | Bell |
| 5,596,711 A | 1/1997 | Burckhartt et al. |
| 5,640,562 A * | 6/1997 | Wold et al. |
| 5,646,535 A | 7/1997 | Dornier |
| 5,661,668 A | 8/1997 | Yemini et al. |
| 5,732,268 A | 3/1998 | Bizzarri |
| 5,764,882 A | 6/1998 | Shingo |
| 5,794,054 A * | 8/1998 | Le et al. |
| 6,122,734 A * | 9/2000 | Jeon |

* cited by examiner

Primary Examiner—Gopal C. Ray
(74) Attorney, Agent, or Firm—Haynes and Boone, LLP

(57) ABSTRACT

Method and apparatus for conveniently diagnosing and conveying to a user the cause of a catastrophic failure during POST of a non-booting PC is described. In one embodiment, when an ID code identifying a POST procedure is written to port 80h, the ID code is also written to a POST code field in a non-volatile memory device. If the PC "hangs" prior to completion of POST, there will be a non-zero byte in the POST code field identifying which POST procedure resulted in the hang. Accordingly, if during boot-up of the PC, a non-zero byte is detected in the POST code field, the ID code will be beeped to the user to identify the POST procedure that caused the PC to hang. If POST completes successfully, the POST code field is set to zero and POST continues through the normal sequence. In an alternative embodiment, after the ID code identifying the next POST procedure to be performed has been written to port 80h and to the POST code field, a timeout value is added to a watchdog timer, at which point the POST procedure is initiated. If the watchdog timer times out, the PC will automatically re-boot. Upon re-boot, if the value stored in the POST code field is non-zero, the POST code field value will be beeped as a message to the user, as described above.

17 Claims, 2 Drawing Sheets

METHOD AND APPARATUS FOR DIAGNOSING AND CONVEYING AN IDENTIFICATION CODE IN POST ON A NON-BOOTING PERSONAL COMPUTER

BACKGROUND

The disclosure herein relates generally to personal computers ("PCS") and, more particularly, to a method and apparatus for diagnosing and conveying the identity of a hanging test or initialization in POST on a non-booting or hanging PC and for identifying a failure in a no-POST/no-video PC without requiring user intervention.

During the boot sequence of a PC, if the PC encounters a critical or catastrophic failure, there is currently no simple, reliable mechanism for alerting the user or a technician to the cause thereof. If the failure locks up the PC prior to video initialization, the PC will appear to be dead. After video installation, the PC displays what has already been tested in POST, but does not display the current, "hanging," test. Any failure that causes the PC to hang is reset when the PC is rebooted, so POST continues down the original path to the hanging test with no notification.

Error conditions in POST are conventionally indicated by one or both of audio tones provided through a speaker of the PC and text messages written to the video display of a PC. For example, most BIOS systems for PCS are configured to provide a beep tone if a portion of a POST routine has failed. As another example, most PCS have pre-stored error messages that are accessed and displayed if certain error conditions are encountered.

Beyond beep tones and pre-stored error messages, many current PCS make more detailed information available to a user by writing to an I/O port, typically I/O address port 0080h ("port 80h"). Such detailed information may be accessed by a user by installation of a special expansion card, called a POST or a "Port 80," card. Installation of a POST card, however, requires removing the PC's cover and installing the card in one of the expansion slots typically provided within the chassis of the PC. The installation and configuration of expansion cards is a task beyond the expertise of most computer users.

Other methods exist for diagnosing PC board-level problems, such as logic analyzers, in-circuit analyzers, oscilloscopes, and diagnostic LEDs; however, each of these methods is expensive and requires user-intervention to determine the cause of the problem.

It is clear from the foregoing that there is currently no reliable method for alerting a user of the nature of a failure if a reboot is required to restart the PC. Accordingly, it is likely that the user will attempt to replace parts until the failure is resolved or will be required to bring the PC in to undergo failure analysis using expensive, specialized debugging and analysis equipment.

Therefore, what is needed is a method for determining the extent and probable cause of a critical failure during the boot sequence of a PC without requiring direct contact with the PC to allow for correct parts dispatch to resolve the problem with only one dispatch and at the lowest cost and within the shortest time frame.

SUMMARY

One embodiment, accordingly, is a method and apparatus for conveniently diagnosing and conveying to a user the cause of a failure during POST of a non-booting PC. In one embodiment, when a code identifying ("ID code") a test or initialization process (hereinafter collectively "POST procedure") is written to port 80h, the ID code is also written into a byte designated a "POST code field" in a non-volatile storage device, such as a flash ROM or CMOS device. If the PC "hangs" prior to completion of POST, there will be a non-zero byte in the POST code field identifying which POST procedure resulted in the hang. Accordingly, if during boot-up of the PC, a non-zero byte is detected in the POST code field, indicating that the previous boot failed, the byte, or ID code, will be beeped to the user to identify the POST procedure that caused the PC to hang. Using a published port 80h code listing, the user or technician will be able to determine what procedure POST was attempting to execute when the hang-up occurred.

Upon successful completion of the POST sequence and prior to INT18h/INT19h operating system boot, the POST code field is set to zero to signal POST completion without catastrophic error. Accordingly, the POST process is able to continue through the normal sequence and flag any non-catastrophic errors as it normally does and will pinpoint any catastrophic errors that require a reboot.

In an alternative embodiment, after the ID code identifying the next POST procedure to be performed has been written to port 80h and to the POST code field, a timeout value representing the maximum amount of time required to complete the upcoming POST procedure is added to a watchdog timer. At that point, the POST procedure is initiated. If the watchdog timer times out, the PC will automatically re-boot. Upon re-boot, if the value stored in the POST code field is non-zero, indicating that the watchdog timer triggered and a catastrophic failure has occurred, the POST code field value will be beeped as a message to the user, as described above. In addition, during this second boot, POST can continue to proceed until it hits the hanging POST procedure identified by the beeped value. Based on the functionality, POST can determine whether to skip the hanging POST procedure or automatically enter a more granular, in-depth, test for that procedure, again using the watchdog timer to avoid infinite POST loops.

A technical advantage achieved is that the embodiments provide an inexpensive, easy, and convenient method of diagnosing and remedying catastrophic failures occurring during boot-up of a PC.

A technical advantage achieved with the alternative embodiment is that the ID code identifying the hanging POST procedure is communicated to the user without requiring the user to re-boot the PC.

Another technical advantage achieved with the alternative embodiment is that it provides the ability to automatically recover from or delve more deeply into a hanging POST procedure.

DESCRIPTION OF PREFERRED EMBODIMENTS

Figure 1:
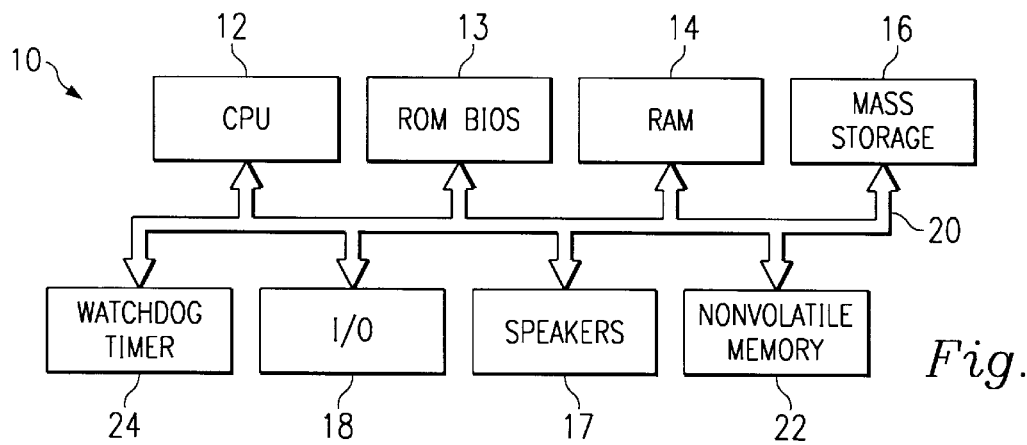
FIG. 1 is a system block diagram of a PC for implementing the embodiments described herein.

FIG. 1 is a system block diagram of a PC 10 embodying features of the embodiments described herein. As shown in FIG. 1, the PC 10 includes a CPU 12, ROM BIOS 13, one or more random access memory devices ("RAM") 14, mass storage devices 16, speakers and associated circuitry for outputting audio to a user 17, and other I/O devices, collectively designated by a reference numeral 18, all interconnected via one or more buses, collectively represented in FIG. 1 by a single bus 20. As the operation and function of the foregoing elements of the PC 10 are well known in the art, the specifics thereof will not be further described in detail, except as necessary to impart a complete understanding of the embodiments described herein. In accordance with the features of the herein-described embodiments, the PC 10 also includes a nonvolatile memory device, such as a flash ROM or CMOS memory, 22 and a watchdog timer 24 for purposes that will be described in greater detail below.

Figure 2A:
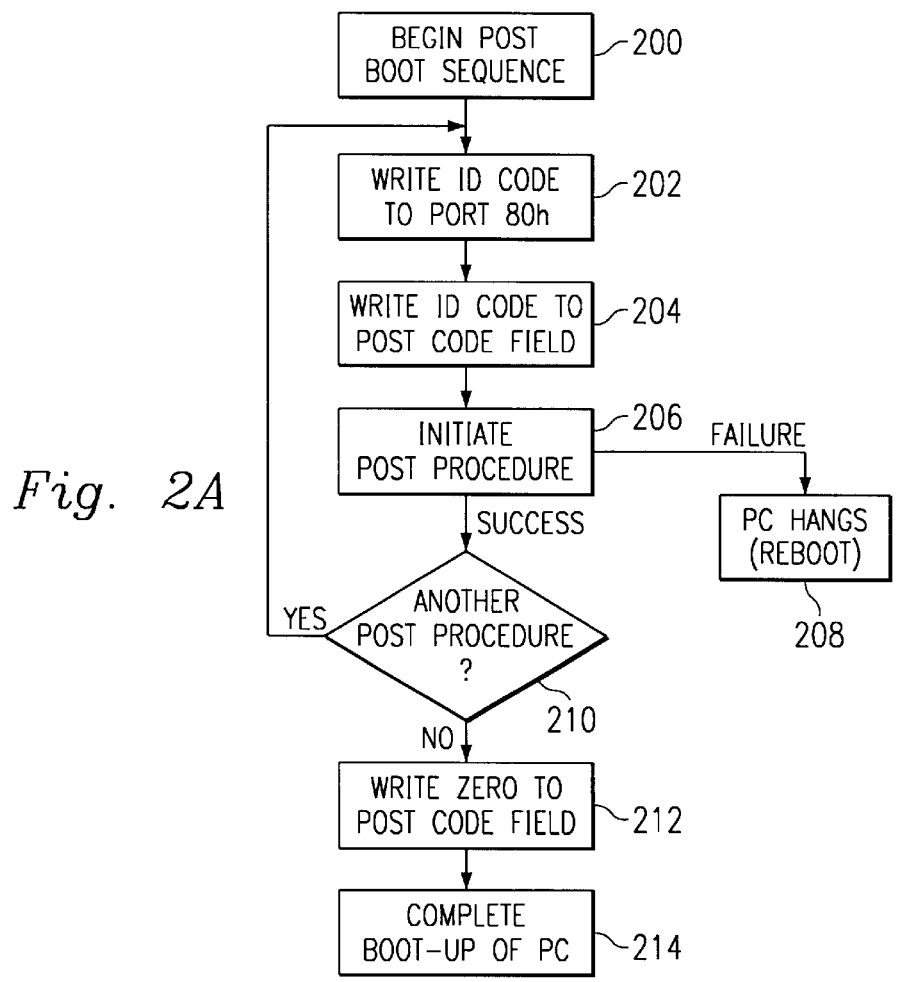
FIGS. 2A and 2B are flowcharts illustrating the operation of one embodiment.

Referring now to FIG. 2A, operation of the PC 10 during an initial boot sequence resulting in a failure will now be described. Upon boot-up of the PC 10, a power on self test ("POST") is initiated. In step 202, an ID code identifying the next POST procedure to be performed is written to port 80h. In step 204, the ID code is also written to a designated location, hereinafter referred to as a "POST code field," in the non-volatile memory 22. In step 206, the POST procedure identified by the ID code written to port 80h and the POST code field is initiated. If the POST procedure initiated in step 206 ends in a catastrophic failure, such that the PC 10 does not boot, execution proceeds to step 208, in which the PC 10 "hangs" and remedial steps, which might include, for example, re-booting the PC 10, must be taken. If the POST procedure initiated in step 206 ends successfully, execution proceeds to step 210, in which a determination is made whether there is another POST procedure to be performed. If so, execution returns to step 202; otherwise, execution proceeds to step 212, in which the ID code stored in the POST code field is set to zero, and then to step 214, in which boot-up of the PC 10 is completed.

It will be recognized that at the end of the above-described sequence, the POST code field will contain, if a catastrophic failure occurs, an ID code identifying the POST procedure that resulted in the failure, or, if a catastrophic failure does not occur and the PC 10 boots successfully, a zero.

Figure 2B:
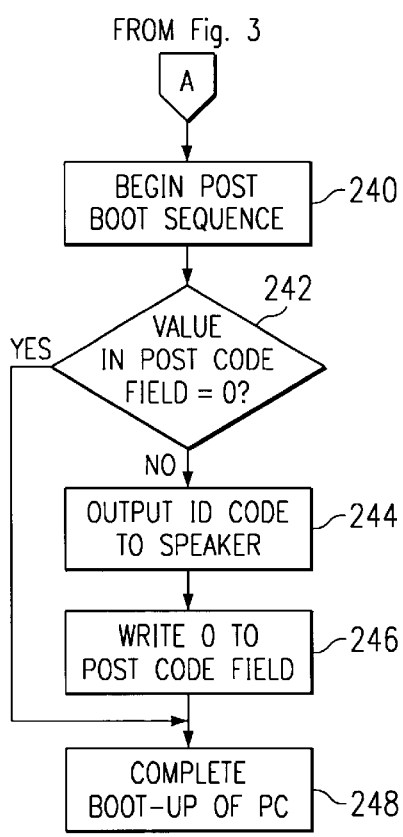

FIG. 2B is a flowchart of the operation of one embodiment during a subsequent boot sequence, or "reboot" of the PC 10 after the PC hangs (step 208). As shown in FIG. 2B, upon boot-up of the PC 10, a power on self test ("POST") is initiated in step 240. In step 242, a determination is made whether the port 80h code stored in the POST code field is zero. If not, execution proceeds to step 244, in which the ID code stored in nonvolatile memory device is output to the user via the speakers 17 as a beep code. Execution then proceeds to step 246, in which the ID code stored in the POST code field is reset to zero. POST continues execution in step 248 to completion, if possible; alternatively, if the PC 10 hangs again, remedial measures must be taken based ion the identity of the failed procedure, which is now known to the user. If in step 242, a determination is made that the ID code stored in the POST code field is zero, execution proceeds directly to step 248.

It will be recognized that, as a result of the sequence described with reference to FIG. 2B, upon any reboot of the PC 10 following a boot resulting in a failure, the identity of the "hanging" procedure will be indicated to the user in the form of a beep code, thereby enabling the user to take the appropriate steps to remedy the situation. This will be true even in the result of a catastrophic failure.

Figure 3:
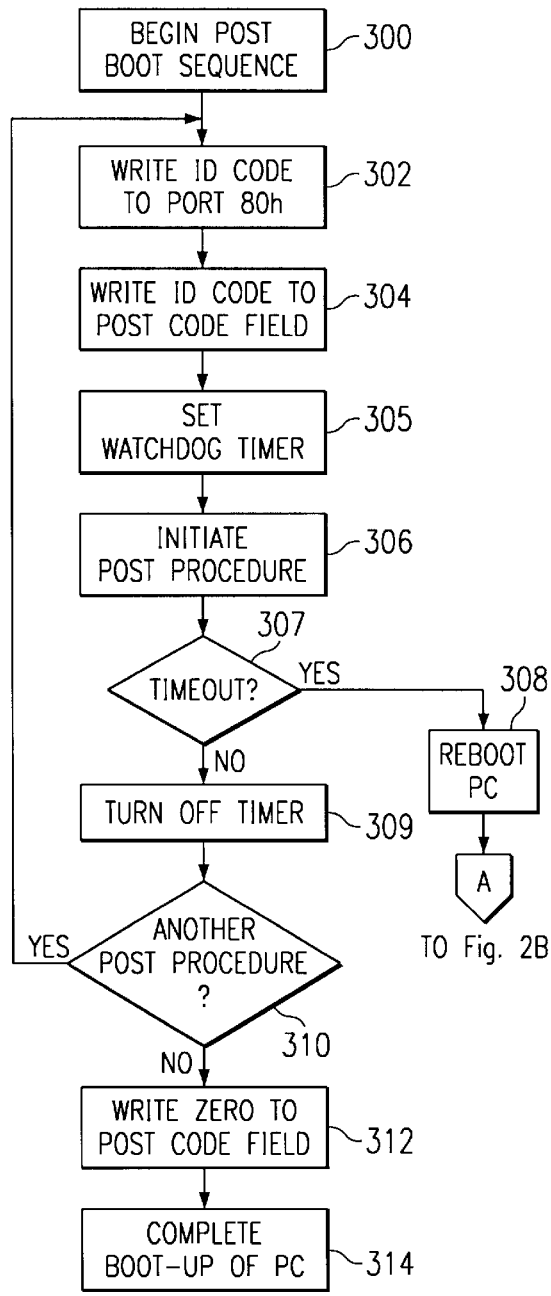
FIG. 3 is a flowchart illustrating the operation of an alternative embodiment.

FIG. 3 is a flowchart of an alterative to the embodiment illustrated in FIGS. 2A and 2B. In step 300, upon boot-up of the PC 10, a power on self test ("POST") is initiated. In step 302, an ID code identifying the next POST procedure to be performed is written to port 80h. In step 304, the ID code is written to the POST code field.

In step 305, the watchdog timer 24 is set to a maximum value required to complete the next POST procedure to be performed. In step 306, the POST procedure identified by the ID code written to port 80h and the POST code field is initiated. In step 307, a determination is made whether the watchdog timer 24 has timed out. If so, indicating that the current POST procedure has failed, execution proceeds to step 308, in which the PC 10 is automatically rebooted, and then to step 240 of FIG. 2B. If the current POST procedure is completed before the watchdog timer 24 times out, execution proceeds to step 309, in which the timer is turned off, and then to step 310, in which a determination is made whether there is another POST procedure to be performed. If so, execution returns to step 302; otherwise, execution proceeds to step 312, in which the ID code stored in the POST code field is set to zero, and then to step 314, in which boot-up of the PC 10 is completed.

It should be noted that, during the second boot-up of the PC 10, POST can continue to proceed until it hits the hanging POST procedure identified by the beeped value. Based on the functionality, POST can determine whether to skip the hanging POST procedure or automatically enter a more granular, indepth, test for that procedure, again using the watchdog timer to avoid infinite POST loops. The identity and extent of such tests will be left to the discretion of the programmer. For example, if the hangup is caused by the failure of a non-critical component, such as a USB, serial, or parallel port, the solution could be to disable the component and proceed as usual, posting a message regarding the disabled device to video once video is enabled. Alternatively, if the failed component is critical, such as the PCI bus or RAM, a more in depth testing can be performed with respect to the component to determine exactly the location and cause of the failure and then, if possible, to disable that portion of the component that caused the failure (e.g., a particular PCI slot or memory bank) or go into a diagnostics program to correct the problem.

It will be recognized that the foregoing sequence will result in the PC 10 being automatically rebooted upon the occurrence of a failure, such that the beep code of the POST procedure that caused the failure is broadcast to the user, without any action being necessary on the part of the user to reboot the PC 10. This is especially useful in cases in which the user would not know to reboot the PC 10 to determine the identity of the failing POST procedure.

Although illustrative embodiments have been shown and described, other modifications, changes, and substitutions are intended in the foregoing disclosure. Accordingly, it is appropriate that the appended claims be construed broadly and in a manner consistent with the scope of the disclosure.

What is claimed is:

1. A method performed by a computer, the method comprising:

during boot up of the computer, writing an ID code identifying a power on self test ("POST") procedure to a POST code field in a nonvolatile memory device of the computer;

initiating the POST procedure;

responsive to the POST procedure completing successfully, determining whether there is another POST procedure to be performed and, if not, writing a zero to the POST code field before completing boot up of the computer; and responsive to the POST procedure completing successfully and a determination that there is another POST procedure to be performed, writing an ID code of a next POST procedure to be performed to the POST code field.

2. The method of claim 1 further comprising responsive to the POST procedure not completing successfully, rebooting the computer.

3. The method of claim 2 wherein the rebooting the computer comprises:
determining whether a value stored in the POST code field is zero;
if the value stored in the POST code field is not zero, outputting the ID code stored in the POST code field to a speaker of the computer, writing a zero to the POST code field, and completing boot up of the computer, if possible; and
if the value stored in the POST code field is zero, completing boot up of the computer.

4. The method of claim 1 further comprising:
prior to the initiating the POST procedure, setting a watchdog timer to a predetermined time;
subsequent to the initiating the POST procedure and prior to the determining whether there are any more POST procedures to be performed, determining whether the watchdog timer has timed out;
if the watchdog timer has timed out, rebooting the computer; and
if the watchdog timer has not timed out, turning off the watchdog timer.

5. The method of claim 4 wherein the rebooting the computer comprises:
determining whether a value stored in the POST code field is zero;
if the value stored in the POST code field is not zero, outputting the ID code stored in the POST code field to a speaker of the computer, writing a zero to the POST code field, and completing boot up of the computer, if possible; and
if the value stored in the POST code field is zero, completing boot up of the computer.

6. A method performed by a computer, the method comprising:
during a power on self test ("POST") sequence of the computer, writing an ID code identifying a POST procedure to a POST code field in a nonvolatile memory device of the computer;
initiating the POST procedure identified by the ID code in the POST code field;
responsive to the POST procedure not completing successfully, rebooting the computer, the rebooting comprising:
determining whether a value stored in the POST code field is zero;
if the value stored in the POST code field is zero, completing boot up of the computer;
if the value stored in the POST code field is not zero, outputting the ID code stored in the POST code field to a speaker of the computer, writing a zero to the POST code field, and completing boot up of the computer, if possible; and
if completing boot up of the computer is not possible, awaiting remedial measures.

7. The method of claim 6 further comprising:
responsive to the POST procedure completing successfully, determining whether there is another POST procedure to be performed;
responsive to a determination that there is not another POST procedure to be performed, writing a zero to the POST code field before completing boot up of the computer; and
responsive to a determination that there is another POST procedure to be performed, writing an ID code of a next POST procedure to be performed to the POST code field.

8. The method of claim 6 further comprising:
prior to the initiating the POST procedure, setting a watchdog timer to a predetermined time;
subsequent to the initiating the POST procedure and prior to the determining whether there are any more POST procedures to be performed, determining whether the watchdog timer has timed out;
if the watchdog timer has timed out, rebooting the computer; and
if the watchdog timer has not timed out, turning off the watchdog timer.

9. A method performed by a computer, the method comprising:
during boot up of the computer, writing an ID code identifying a power on self test ("POST") procedure to a POST code field in a nonvolatile memory device of the computer;
setting a watchdog timer to a predetermined time sufficient to complete the POST procedure;
initiating the POST procedure;
determining whether the watchdog timer has timed out;
if the watchdog timer has timed out, automatically rebooting the computer; and
if the watchdog timer has not timed out, turning off the watchdog timer.

10. The method of claim 9 further comprising, if the watchdog timer has not timed out, determining whether there is another POST procedure to be performed and, if not, writing a zero to the POST code field before completing boot up of the computer.

11. The method of claim 9 wherein the automatically rebooting the computer comprises:
determining whether a value stored in the POST code field is zero;
if the value stored in the POST code field is not zero, outputting the ID code stored in the POST code field to a speaker of the computer, writing a zero to the POST code field, and completing boot up of the computer, if possible; and
if the value stored in the POST code field is zero, completing boot up of the computer.

12. The method of claim 9 further comprising:
responsive to the watchdog timer not timing out and a determination that there is another POST procedure to be performed, writing an ID code of a next POST procedure to be performed to the POST code field.

13. Apparatus comprising:
means for writing an ID code identifying a power on self test ("POST") procedure to a POST code field in a nonvolatile memory device of the computer during boot up of the computer;
means for initiating the POST procedure;
means responsive to the POST procedure completing successfully for determining whether is another POST procedure to be performed and, if not, writing a zero to the POST code field before completing boot up of the computer; and means responsive to the POST procedure completing successfully and a determination that there is another POST procedure to be performed for writing an ID code of a next POST procedure to be performed to the POST code field.

14. The apparatus of claim 13 further comprising means responsive to the POST procedure not completing successfully, rebooting the computer.

15. The apparatus of claim 14 wherein the means for rebooting the computer comprises:

means for determining whether a value stored in the POST code field is zero;

means for outputting the ID code stored in the POST code field to a speaker of the computer, writing a zero to the POST code field, and completing boot up of the computer, if possible, if the value stored in the POST code field is not zero; and if the value stored in the POST code field is zero, completing boot up of the computer.

16. The apparatus of claim 13 further comprising:

means for setting a watchdog timer to a predetermined time prior to the initiating the POST procedure;

means for determining whether the watchdog timer has timed out subsequent to the initiating the POST procedure and prior to the determining whether there are any more POST procedures to be performed;

means for rebooting the computer if the watchdog timer has timed out; and means for turning off the watchdog timer if the watchdog timer has not timed out.

17. The apparatus of claim 16 wherein the means for rebooting the computer comprises:

means for determining whether a value stored in the POST code field is zero;

means for outputting the ID code stored in the POST code field to a speaker of the computer, writing a zero to the POST code field, and completing boot up of the computer, if possible, if the value stored in the POST code field is not zero; and if the value stored in the POST code field is zero, completing boot up of the computer.

* * * * *